United States Patent
Huggins et al.

(10) Patent No.: US 9,257,865 B2
(45) Date of Patent: Feb. 9, 2016

(54) WIRELESS POWER DISTRIBUTION SYSTEM AND METHOD

(75) Inventors: Mark Huggins, Anderson, SC (US); Robert E. McCracken, Anderson, SC (US); Jason P. Whitmire, Greenville, SC (US); Mike Hornick, Anderson, SC (US)

(73) Assignee: Techtronic Power Tools Technology Limited, Tortola (VG)

( * ) Notice: Subject to any disclaimer, the term of this patent is extended or adjusted under 35 U.S.C. 154(b) by 920 days.

(21) Appl. No.: 13/426,843

(22) Filed: Mar. 22, 2012

(65) Prior Publication Data

US 2012/0187851 A1 Jul. 26, 2012

Related U.S. Application Data

(63) Continuation-in-part of application No. 12/692,261, filed on Jan. 22, 2010, now abandoned.

(60) Provisional application No. 61/146,534, filed on Jan. 22, 2009, provisional application No. 61/147,647, filed on Jan. 27, 2009.

(51) Int. Cl.
*H05B 37/02* (2006.01)
*H02J 7/02* (2006.01)

(52) U.S. Cl.
CPC ..................................... *H02J 7/025* (2013.01)

(58) Field of Classification Search
CPC .............. H02J 7/00; H02J 7/025; H02J 17/00
USPC ........................................................ 320/108
See application file for complete search history.

(56) References Cited

U.S. PATENT DOCUMENTS

| 3,235,771 | A | 2/1966 | Schwartz |
| 5,034,658 | A | 7/1991 | Hiering et al. |

(Continued)

FOREIGN PATENT DOCUMENTS

| JP | 05047476 | 2/1993 |
| WO | 2006/127624 | 11/2006 |

(Continued)

OTHER PUBLICATIONS

Chu, Jennifer, "TR10: Wireless Power Physicist Marin Soljacic is Working Toward a World of Wireless Electricity", Technology Review, publised by MIT, Mar./Apr. 2008.

(Continued)

*Primary Examiner* — Jeffrey Zweizig
(74) *Attorney, Agent, or Firm* — Michael Best & Friedrich LLP

(57) ABSTRACT

A wireless power distribution system and method for power tools and other battery-powered devices. The system includes a power transmitter and a plurality of power harvesters or receivers. The receivers are located in power tools, battery packs that are attachable to and detachable from the power tools, a device or case that is interfaceable with the power tool or battery pack, conventionally-sized batteries, or other battery-powered devices. The power transmitter transmits radio frequency ("RF") power signals to the receivers that are within transmission range of the power transmitter. The receivers receive the RF power signals and convert the RF power signals into direct current. The direct current is used to charge a battery, directly power a tool, etc.

12 Claims, 17 Drawing Sheets

(56) References Cited

U.S. PATENT DOCUMENTS

| | | | |
|---|---|---|---|
| 5,962,982 | A | 10/1999 | Mancuso |
| 6,160,353 | A | 12/2000 | Mancuso |
| 6,208,115 | B1 * | 3/2001 | Binder .......... 320/108 |
| 6,392,504 | B1 | 5/2002 | Stein |
| 6,476,565 | B1 | 11/2002 | Kaminski |
| 6,661,197 | B2 * | 12/2003 | Zink et al. .......... 320/108 |
| 6,700,334 | B2 | 3/2004 | Weng |
| 6,771,143 | B2 | 8/2004 | Stein et al. |
| 6,882,128 | B1 | 4/2005 | Rahmel et al. |
| 6,967,462 | B1 | 11/2005 | Landis |
| 6,984,944 | B2 | 1/2006 | Garrity |
| 7,068,991 | B2 | 6/2006 | Parise |
| 7,081,693 | B2 | 7/2006 | Hamel et al. |
| 7,288,918 | B2 | 10/2007 | Di Stefano |
| 7,408,521 | B2 | 8/2008 | Smith et al. |
| 7,639,994 | B2 | 12/2009 | Greene et al. |
| 7,688,028 | B2 | 3/2010 | Phillips et al. |
| 7,692,411 | B2 | 4/2010 | Trainor et al. |
| 7,868,482 | B2 | 1/2011 | Greene et al. |
| 7,898,105 | B2 | 3/2011 | Greene et al. |
| 7,925,308 | B2 | 4/2011 | Greene et al. |
| 7,952,322 | B2 | 5/2011 | Partovi |
| 7,956,572 | B2 | 6/2011 | Zane et al. |
| 7,990,103 | B2 | 8/2011 | Klinghult |
| 8,022,937 | B2 | 9/2011 | Palay et al. |
| 8,026,693 | B2 | 9/2011 | Burley |
| 8,030,887 | B2 | 10/2011 | Jung |
| 8,093,864 | B2 * | 1/2012 | Wright .......... 320/134 |
| 8,106,607 | B2 | 1/2012 | Pope |
| 8,115,448 | B2 | 2/2012 | John |
| 8,115,449 | B2 | 2/2012 | Jung |
| 8,159,090 | B2 | 4/2012 | Greene et al. |
| 8,184,454 | B2 | 5/2012 | Mao |
| 8,228,026 | B2 * | 7/2012 | Johnson et al. .......... 320/108 |
| 8,970,166 | B2 * | 3/2015 | Hoffman et al. .......... 320/108 |
| 2006/0164307 | A1 | 7/2006 | Smith et al. |
| 2006/0199620 | A1 | 9/2006 | Greene et al. |
| 2006/0281435 | A1 | 12/2006 | Shearer et al. |
| 2007/0060098 | A1 | 3/2007 | McCoy |
| 2007/0149162 | A1 | 6/2007 | Greene et al. |
| 2007/0173214 | A1 | 7/2007 | Mickle et al. |
| 2007/0178945 | A1 | 8/2007 | Cook et al. |
| 2007/0191074 | A1 | 8/2007 | Harrist et al. |
| 2007/0191075 | A1 | 8/2007 | Greene et al. |
| 2007/0290924 | A1 | 12/2007 | McCoy |
| 2007/0298846 | A1 | 12/2007 | Greene et al. |
| 2008/0014897 | A1 | 1/2008 | Cook et al. |
| 2008/0054638 | A1 | 3/2008 | Greene et al. |
| 2008/0061734 | A1 | 3/2008 | Roehm et al. |
| 2008/0094025 | A1 | 4/2008 | Rosenblatt et al. |
| 2008/0166965 | A1 | 7/2008 | Greene et al. |
| 2008/0169910 | A1 | 7/2008 | Greene et al. |
| 2008/0186233 | A1 | 8/2008 | McCoy |
| 2008/0227484 | A1 | 9/2008 | Auvray et al. |
| 2009/0102296 | A1 | 4/2009 | Greene et al. |
| 2009/0206791 | A1 | 8/2009 | Jung |
| 2010/0029268 | A1 | 2/2010 | Myer et al. |
| 2010/0038970 | A1 | 2/2010 | Cook et al. |
| 2010/0060232 | A1 | 3/2010 | Boyles et al. |
| 2010/0237873 | A1 | 9/2010 | Franke et al. |
| 2010/0327766 | A1 | 12/2010 | Recker et al. |

FOREIGN PATENT DOCUMENTS

| | | |
|---|---|---|
| WO | 2007/008608 | 1/2007 |
| WO | 2007/050519 | 5/2007 |
| WO | 2007/081971 | 7/2007 |
| WO | 2007/089680 | 8/2007 |

OTHER PUBLICATIONS

Miller, Ross, "Powermat Hands-On", Engadget, available online at: <http://www.engadget.com/2009/01/06/powermat-hands-on/>, Jan. 6, 2009.

* cited by examiner

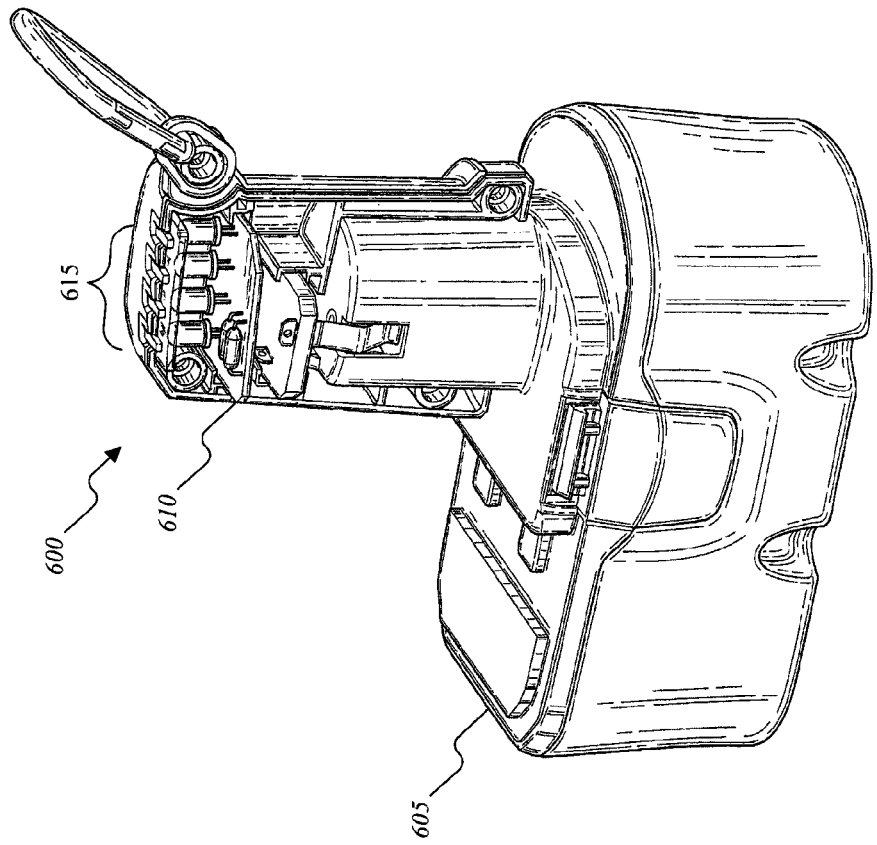
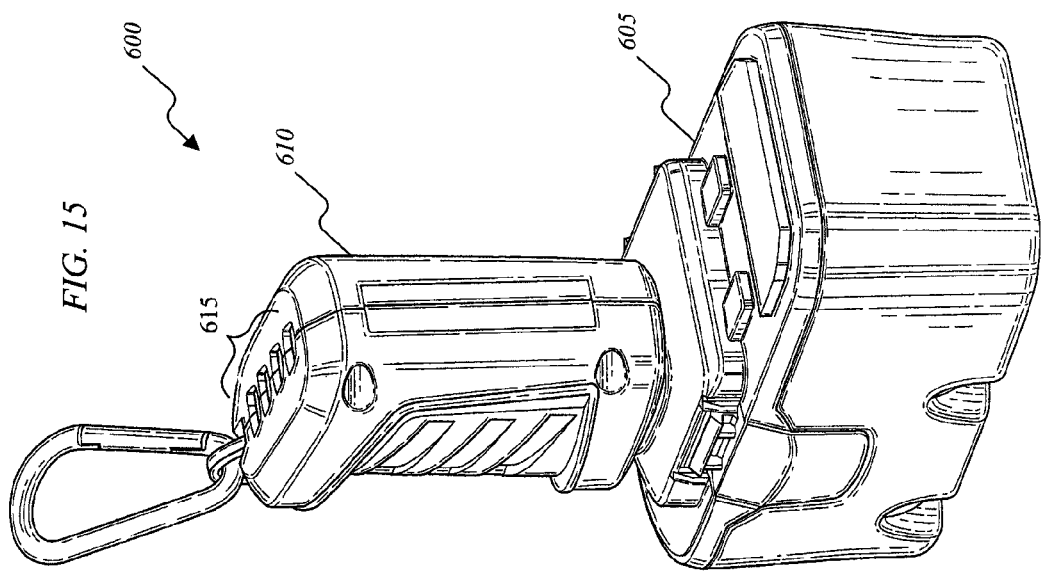

WIRELESS POWER DISTRIBUTION SYSTEM AND METHOD

RELATED APPLICATIONS

This application is a continuation-in-part of previously-filed, co-pending U.S. patent application Ser. No. 12/692,261, filed Jan. 22, 2010, which claims the benefit of U.S. Provisional Patent Application No. 61/146,534, filed Jan. 22, 2009, and U.S. Provisional Patent Application No. 61/147,647, filed on Jan. 27, 2009, the entire contents of all of which are hereby incorporated by reference.

BACKGROUND

The present invention relates to wireless power distribution for power tools. Power tools are generally classified as corded and cordless tools. A corded power tool includes a direct physical and electrical connection to a power source, such as a 120V AC wall outlet, and does not include any integral or detachable power sources (e.g., batteries or battery packs). Some corded tools can also be physically and electrically connected to a DC power source, such as a cigarette lighter. However, corded power tools have limited portability and range of use because of the required direct physical and electrical connection with the wall outlet, DC power source (e.g., a vehicle), or a similar stationary power source.

To improve the portability and range of use of corded power tools, cordless power tools were developed which include a replaceable or rechargeable battery pack. The replaceable and rechargeable battery packs used in cordless power tools, although efficient and capable of supplying the currents required by many power tools, are limited by both the power storage capacity of battery cells, and the requirement of discrete battery chargers for recharging each pack.

SUMMARY

Embodiments of the invention provide a wireless power distribution system and method for power tools and other battery powered devices. The system includes a power transmitter and a plurality of power harvesters or receivers. The receivers are located in power tools, battery packs that are attachable to and detachable from the power tools, or a device or case that is interfaceable with the power tool or battery pack (e.g., a battery charger). The power transmitter transmits radio frequency ("RF") power signals to the power tools that are within transmission range of the power transmitter. The receivers receive the RF power signals and convert the RF power signals into direct current. The direct current is used to charge a battery, directly power a tool, or both.

In one embodiment, the invention provides a wireless power distribution system. The system includes a power transmitter, a power harvester, and a conventionally-sized battery. The power transmitter is configured to transmit a power signal within a first power distribution volume. The power harvester is configured to receive the transmitted power signal and determine whether the received power signal is greater than a threshold power value. The conventionally-sized battery is configured to be in electrical communication with the power harvester, and is configured to receive power from the power harvester when the received power signal is greater than the threshold power value. The power harvester is positioned within a housing of the conventionally-sized battery.

In another embodiment, the invention provides a wireless power distribution system. The system includes at least one power transmitter and at least one receiver. The at least one power transmitter is configured to transmit a power signal within a first power distribution volume, and the at least one receiver is configured to receive the power signal. The at least one receiver includes a power harvester, at least one battery, a light source, and a light sensor. The receiver is configured to determine whether the received power signal is greater than a power threshold value. The at least one battery is configured to be in electrical communication with the at least one power harvester and receive power from the at least one power harvester when the received power signal is greater than the power threshold value. The light sensor is configured to detect an amount of ambient light, and the light source selectively receives power from the battery when the amount of ambient light is below a light threshold value.

In another embodiment, the invention provides a method of wirelessly distributing power. The method includes generating a power signal at a power transmitter, transmitting the power signal within a power distribution volume, and receiving the power signal at a power harvester. The received power signal is compared to a power threshold value and provided to a battery when the received power signal is greater than the power threshold value. The method also includes charging the battery using the received power signal, selectively inserting the battery into a device, and selectively powering the device using the battery when the power signal is below the power threshold value. The battery is capable of being charged without being removed from the device.

Other aspects of the invention will become apparent by consideration of the detailed description and accompanying drawings.

BRIEF DESCRIPTION OF THE DRAWINGS

FIG. 15 illustrates the battery charger of FIG. 13 coupled to a battery pack.

FIG. 16 illustrates a cross-sectional view of the battery charger of FIG. 13 coupled to a battery pack as shown in FIG. 15.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Embodiments of the invention described herein relate to wireless power distribution systems, methods, and devices for power tools and other battery-powered devices. A system includes a power transmitter, a power harvester or receiver, and an antenna. The system is operable to charge, or supply power directly to, a plurality of devices such as battery packs, power tools, battery chargers, test and measurement equipment, vacuum cleaners, outdoor power equipment, and vehicles. Power tools can include drills, circular saws, jig saws, band saws, reciprocating saws, screw drivers, angle grinders, straight grinders, hammers, impact wrenches, angle drills, inspection cameras, and the like. Battery chargers can include wall chargers, multi-port chargers, travel chargers, and the like. Test and measurement equipment can include digital multimeters, clamp meters, fork meters, wall scanners or stud sensors, IR temperature guns, laser distance meters, laser levels, remote displays, insulation testers, moisture meters, thermal imagers, and the like. Vacuum cleaners can include stick vacuums, hand vacuums, upright vacuums, carpet cleaners, hard surface cleaners, canister vacuums, broom vacuums, and the like. Outdoor power equipment can include blowers, chain saws, edgers, hedge trimmers, lawn mowers, trimmers, and the like. The battery pack can also be attachable to and detachable from devices such as electronic key boxes, calculators, cellular phones, head phones, cameras, motion sensing alarms, flashlights, utility lights, weather information display devices, a portable power source, a digital camera, a digital music player, a self-leveling laser, and multi-purpose cutters. The system can also be used to supply power to industrial power tools used in manufacturing systems such as cellular manufacturing or assembly line manufacturing systems. For example, each corded power tool associated with a work cell in a cellular manufacturing process can be replaced with a cordless power tool that includes a rechargeable battery pack. The battery packs are continuously charged by a power transmitter associated with the work cell. Alternatively, the battery packs are charged when the power tools are not being used.

Figure 1:
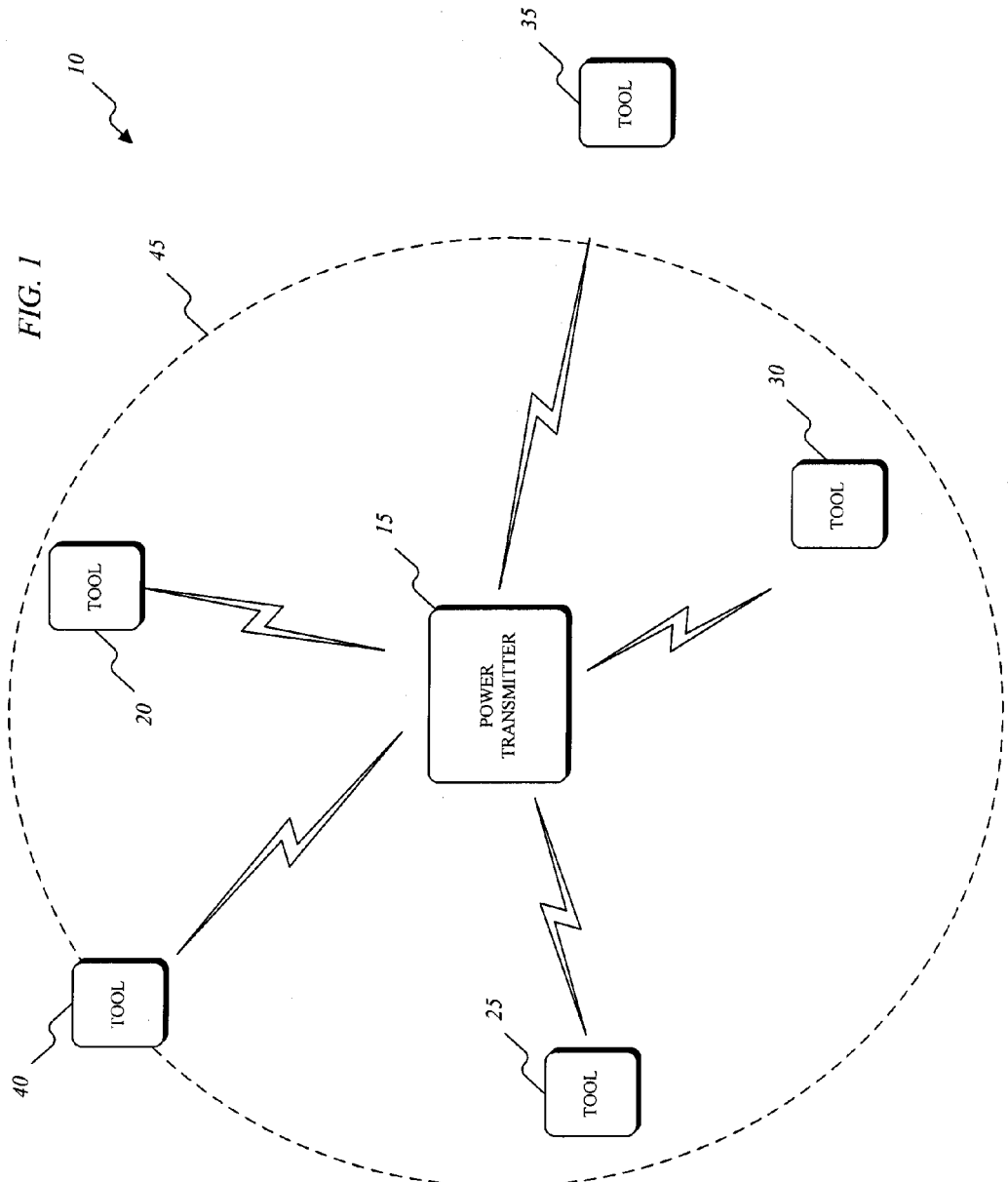
FIG. 1 illustrates a wireless power distribution system according to an embodiment of the invention.

FIG. 1 illustrates a wireless power distribution system 10. The distribution system 10 includes a power transmitter 15 and a plurality of tools 20-40. The tools 20-40 are operable to receive, for example, RF power signals from the power transmitter 15, and convert the power signals into a DC current to provide power directly to the tool, charge a battery pack, or both. The power transmitter 15 has a first transmission range 45 which is dependent upon, among other things, the strength of the power transmitter 15 and the power requirements of the tools 20-40, as well as environmental factors such as walls or surfaces through which the signals must propagate. Although the transmission range 45 is illustrated two-dimensionally, the transmission range of the power transmitter is a three-dimensional transmission or distribution volume. In some embodiments, the power distribution system 10 transmits power in a manner similar to that disclosed in U.S. Patent Publication No. 2007/0191074, titled "Power Transmission Network and Method," and U.S. Patent Publication No. 2007/0298846, titled "Wireless Power Transmission," the entire contents of both of which are hereby incorporated by reference. A tool must be within the first transmission range 45 to receive RF power signals from the power transmitter 15 that are above a first threshold value (e.g., have sufficiently strong signals to power the tool or charge a battery). The tools 20, 25, and 30 are within the first transmission range 45 of the power transmitter 15, and receive sufficient power from the RF power signals to power one or more features or functions of the tools, or charge their battery packs. Tool 35 is located outside of the first transmission range 45 and, therefore, receives insufficient power from the RF power signals to operate the tool or charge its battery pack. Tool 40 is located at an outer portion of the first transmission range 45 and may experience intermittent power reception as a result.

In some embodiments, the tools 20-40 include a threshold circuit for determining whether the RF power signals being received are above the first threshold value. If insufficient RF power signals are being received and their battery packs are depleted, the tools 20-40 are rendered inoperable, or the tools 20-40 enter a low-power mode in which the battery pack is charged (e.g., trickle charged). Each tool is then inoperable until the RF power signals are above the threshold, or the battery pack has been charged. In other embodiments, the tools 20-40 are operable when receiving RF power signals below the first threshold value. For example, when receiving RF power signals below the threshold value, features or functions of the tools 20-40 can be disabled, such as a display, to conserve power or limit power requirements. Although the first transmission range 45 is circular in FIG. 1, the actual range of the power transmitter 15 can vary based on the power requirements of the tools 20-40 and the transmission strength of the RF power signals, as described above, and can take on different shapes or distribution patterns (e.g., a directed power distribution).

In other embodiments, different wireless power distribution techniques are used. For example, instead of using RF signals to transmit power, resonant coupling can be used in which two devices, which are tuned to the same frequency, exchange energy strongly, but interact weakly with other objects. At a basic level, a resonant coupling wireless power distribution system includes, for example, a first resonant coil in a transmitter and a second resonant coil in a receiver. The transmitter and the receiver are tuned to the same frequency, and the receiver is connected to, for example, a battery pack or one of the plurality of tools 20-40. In some embodiments, the power transmitter is operable to focus or direct transmitted power signals on a single device. For example, the power transmitter is able to communicate with a device or tool to identify the device or tool, and the transmitter is able to focus on a single device or tool (e.g., transmit power at a particular frequency) based on a user selected preference or general priority. In some embodiments, the power transmitter is configured to focus on charging battery packs at an optimal level (e.g., maximum signal strength) before other devices are charged or powered. In other embodiments, the transmitter is configured to provide a maximum signal strength to a tool, such as a drill or saw, which requires a significant level of current to operate. When the tool is not being used, the transmitter provides power signals to other devices.

Figure 3:
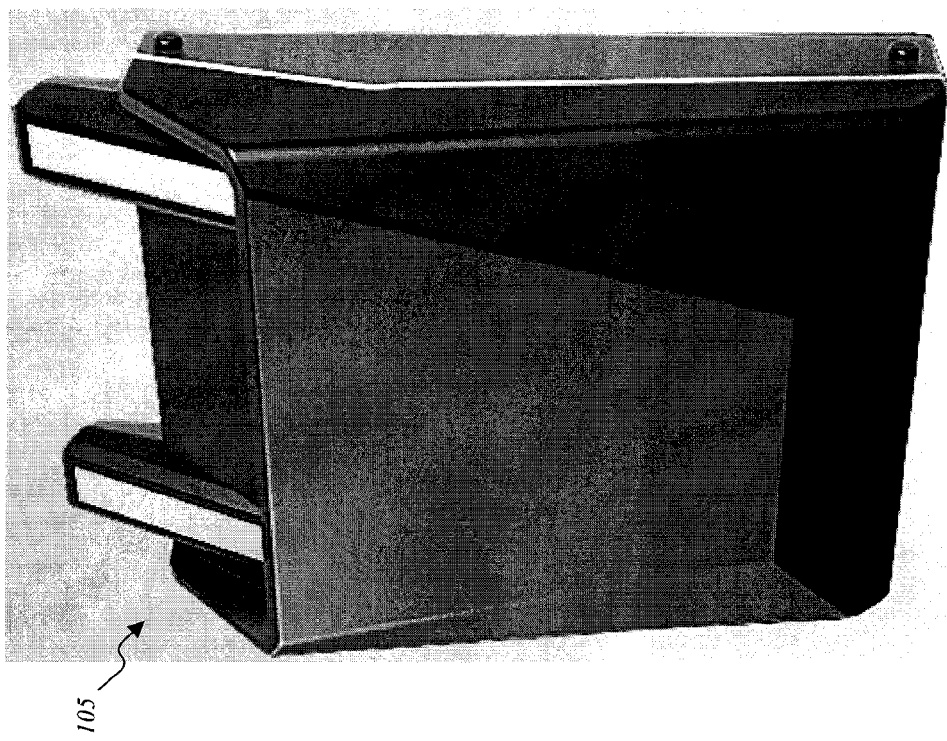
FIG. 3 illustrates a cordless power transmitter according to an embodiment of the invention.
Figure 2:
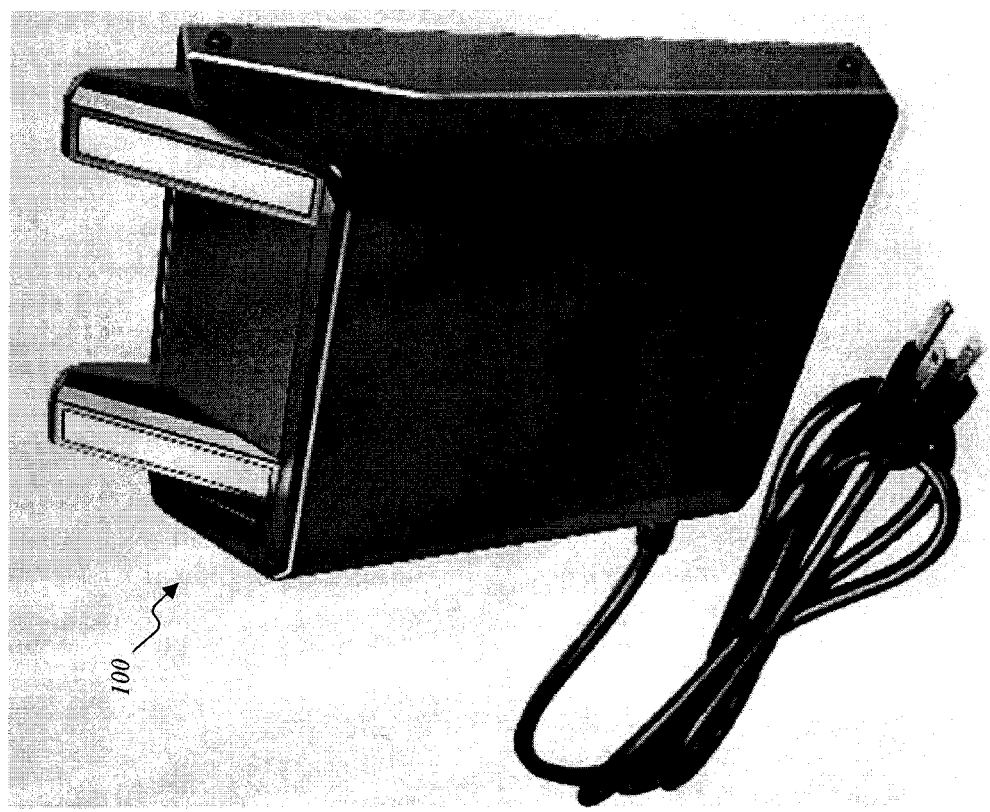
FIG. 2 illustrates a corded power transmitter according to an embodiment of the invention.

FIGS. 2 and 3 illustrate power transmitters 100 and 105. In some embodiments, the power transmitters 100 and 105 function in a manner similar to those disclosed in U.S. patent application Ser. No. 11/651,818, titled "Pulse Transmission Method," the entire content of which is hereby incorporated by reference. The power transmitter 100 includes a corded plug for receiving power from a standard 120V AC wall outlet. In other embodiments, the power transmitter 100 is powered from other Mains power sources, such as a 240V AC source or the like. Additionally or alternatively, the power transmitter 100 includes a plug for receiving power from a DC source such as a cigarette lighter in a vehicle. The power transmitter 105 includes an internal power source, such as a plurality of high-voltage battery cells. The power transmitter 105 is portable and can be moved from location to location to provide wireless power to local devices (e.g., devices within the first transmission range 45). In other embodiments, the power transmitter 105 can be connected or integral to a gasoline-powered or similar generator that supplies power to the power transmitter 105. For example, at a remote work site, workers may not have Mains power available to them. In such an instance, the generator provides the power required by the transmitter 105 to provide RF power signals to local devices.

The transmitters 100 and 105 are also capable of being coupled to a variety of surfaces. For example, in some embodiments, the power transmitters 100 and 105 are fastened to a wall using screws or bolts. In other embodiments, the power transmitters 100 and 105 include a magnetic surface (e.g., a magnetic rear surface) that allows the power transmitters 100 and 105 to be magnetically fastened to a metallic surface. The magnetic surface increases the portability of the power transmitters 100 and 105 by allowing a user to detach the power transmitters 100 and 105 from a surface and move them to a different surface (e.g., a different location at a work site). In some embodiments, the power transmitters 100 and 105 include a portable stand that allows the power transmitters 100 and 105 to be placed away from walls (e.g., in the center of a room), or at a location where there are no walls available for the power transmitters 100 and 105 to be fastened. In other embodiments, the power transmitters 100 and 105 are worn by a user. For example, in some work environments, a worker may be required to move beyond the range of a fixed power transmitter (e.g., a power transmitter fastened to a wall). In such an instance, the user can wear a power transmitter as a backpack or fasten the power transmitter to himself or herself using an alternative method (e.g., a strap), and carry the power transmitter. As a result, the worker is able to supply power to tools that are beyond the transmission range of the fixed power transmitter.

In addition to the power transmitters described above with respect to FIGS. 2 and 3, additional power transmission techniques can be used. In one embodiment of the invention, a power transmitter is incorporated into a jobsite radio for charging or powering tools and devices (e.g., digital music players, radios, etc.) within the transmission range of the power transmitter without requiring a physical connection to the jobsite radio. In another embodiment, a power transmitter is incorporated into a job box, truck box, or a tool box, such as those commonly kept in a truck cabin or bed. The box receives power for one or more power transmitters from an AC wall outlet, a DC car adapter, or a battery (e.g., a lead-acid battery) located near or in the box. The power transmitters are attached to or built into one or more walls of the box such that power tools placed inside or on the box receive strong RF power signals for charging the tools' battery packs.

Figure 4:
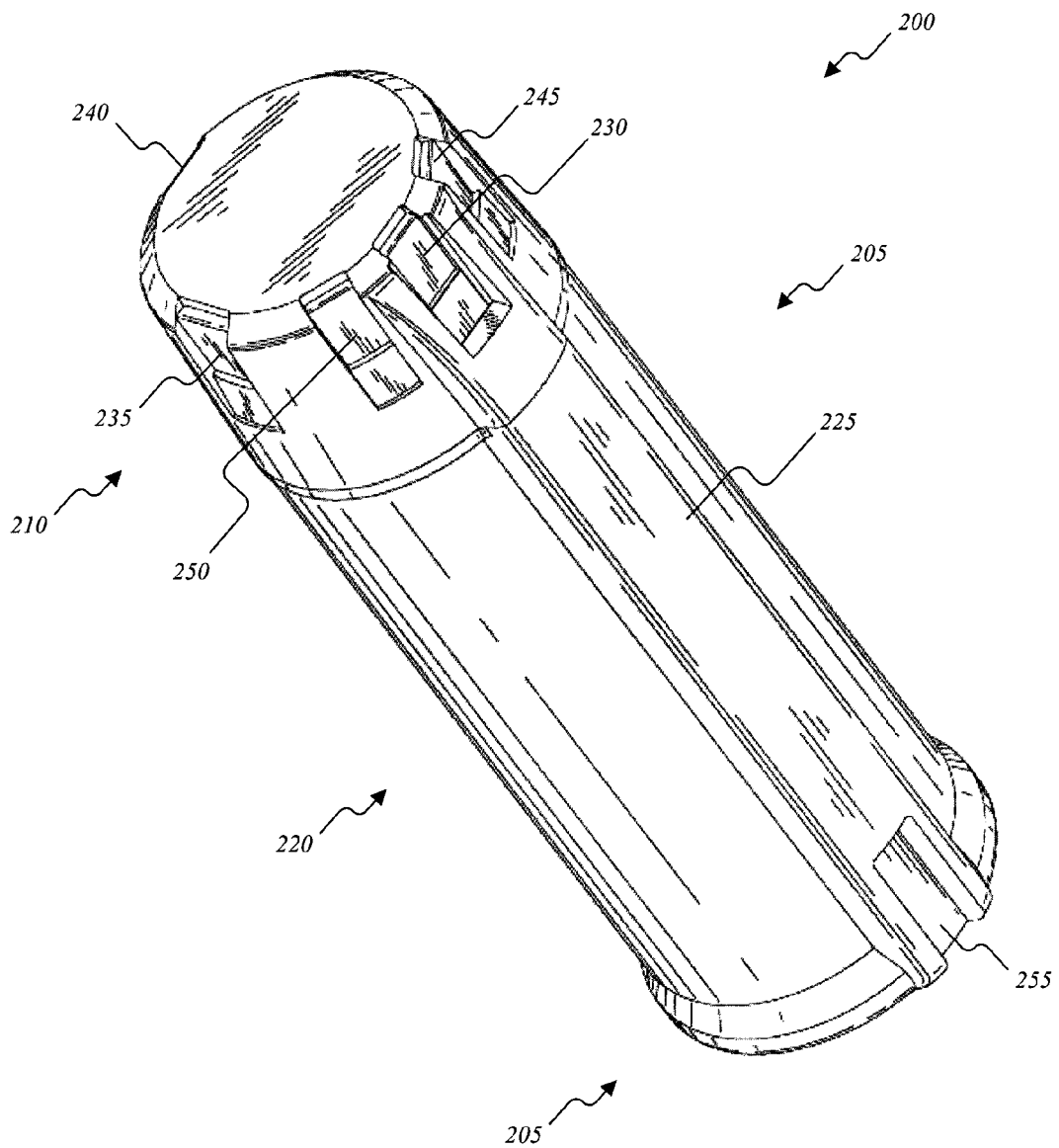
FIG. 4 illustrates a battery pack according to an embodiment of the invention.

FIG. 4 illustrates a battery pack 200 for receiving power signals from a power transmitter. The battery pack 200 includes a housing 205, a first end portion 210, a second end portion 215, a body portion 220, and a mating rib 225, a power harvester (not shown), and an antenna (not shown). In an exemplary embodiment, the power harvester and the antenna function in a manner similar to the power conversion apparatus disclosed in U.S. Patent Publication No. 2007/0178857, titled "Method and Apparatus for High Efficiency Rectification for Various Loads," the entire content of which is hereby incorporated by reference. The first end portion 210 includes a low-current discharge terminal 230, a high-current discharge terminal 235, a positive voltage terminal 240, a pack identification terminal 245, and a pack temperature terminal 250. The first end portion 210 is tapered from the body portion 220 to a distal end of the first end portion 210 of the battery pack 200 to facilitate the mating of the battery pack 200 with an end product.

The body portion 220 is cylindrically-shaped and is positioned between the first end portion 210 and the second end portion 215. The diameter of the body portion 220 is large enough to accommodate at least one battery cell, control circuitry, the power harvester, and the antenna. The power harvester and the antenna are located in the first end portion 210, the second end portion 215, or the body portion 220 of the battery pack 200. Alternatively, the power harvester is located in the first, second, or body portions, and the antenna extends longitudinally from the first end portion 210 to the second end portion 215, or circumferentially about the cell or housing 205 of the battery pack 200.

The mating rib 225 extends longitudinally from the first end portion 210 to the second end portion 215, and prevents the battery pack 200 from rolling when the battery pack is inserted in, or otherwise coupled to, an end product. The mating rib 225 at least partially surrounds one of the plurality of terminals, and is tapered at the first end portion 210 to facilitate the mating of the battery pack with an end product. The second end portion 215 includes a recess 255 for securely attaching the battery pack 200 to an end product. In some embodiments, the mating rib 225 is located at a different position on the housing 205, such that the mating rib 225 does not at least partially surround one of the plurality of terminals. In other embodiments, the battery pack 200 can include multiple mating ribs positioned symmetrically about the housing 205 to further secure the battery pack 200 to an end product and prevent rolling. In some embodiments, the housing is, for example, sonically-welded together and is waterproof. The battery pack 200 includes additional components (e.g., a processor, control switches, and the like) and functions similar to those described in U.S. Patent Publication No. 2010/0190052, filed Jan. 27, 2010 and titled "Battery Pack with High and Low Current Discharge Terminals," the entire content of which is hereby incorporated by reference. Additionally, although the battery pack 200 is illustrated as a single-cell battery pack, other battery packs can be used in the power distribution system that include a plurality of battery cells (e.g., 2-8 battery cells), and can have any of a variety of configurations or form factors. For example, some battery packs are brick-shaped, square-shaped, tower, slide-on, or flat (e.g., a cell-phone battery). Each of these battery packs also includes, for example, a power harvester or power harvester board which includes one or more antennas.

The battery pack 200 is operable to provide power to a power tool via the low-current discharge terminal 230, the high-current discharge terminal 235, or both. In some embodiments, the battery pack 200 provides direct current from the RF power signals directly to the power tool through the low-current discharge terminal 230. In other embodiments, the battery pack 200 provides power to the power tool through the high-current discharge terminal 235 (e.g., from a charged battery cell) and through the low-current discharge terminal 230 (e.g., direct current from the RF power signals) at the same time to power different features or functions of the power tool.

Figure 7:
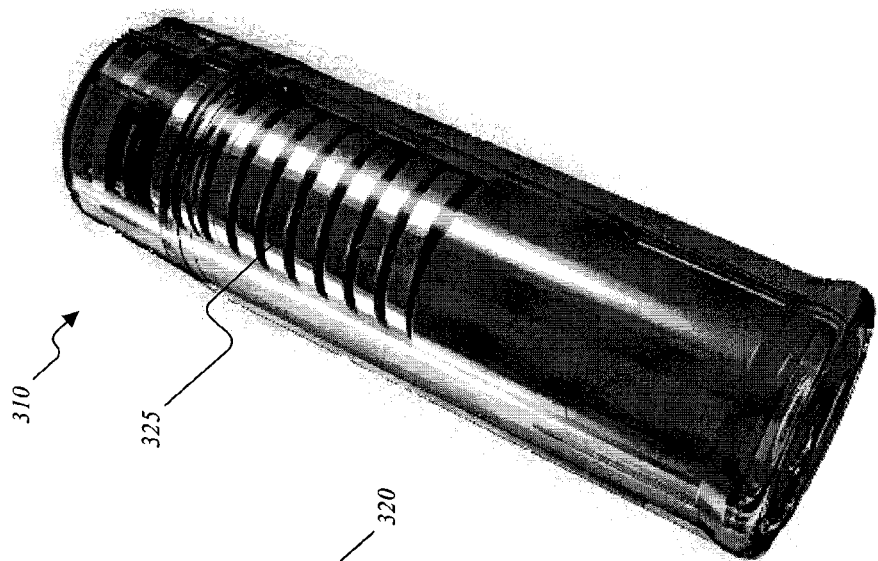
FIG. 7 illustrates a power receiver inside of the battery pack of FIG. 4 according to yet another embodiment of the invention.
Figure 6:
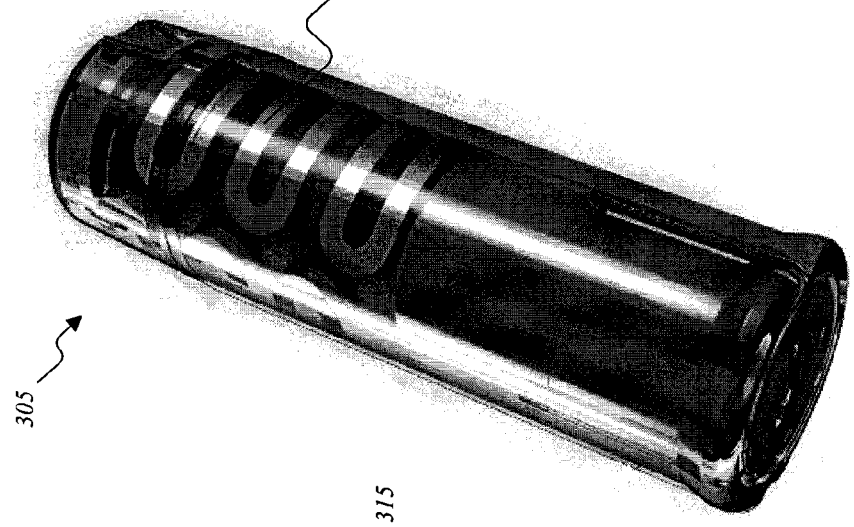
FIG. 6 illustrates a power receiver inside of the battery pack of FIG. 4 according to another embodiment of the invention.
Figure 5:
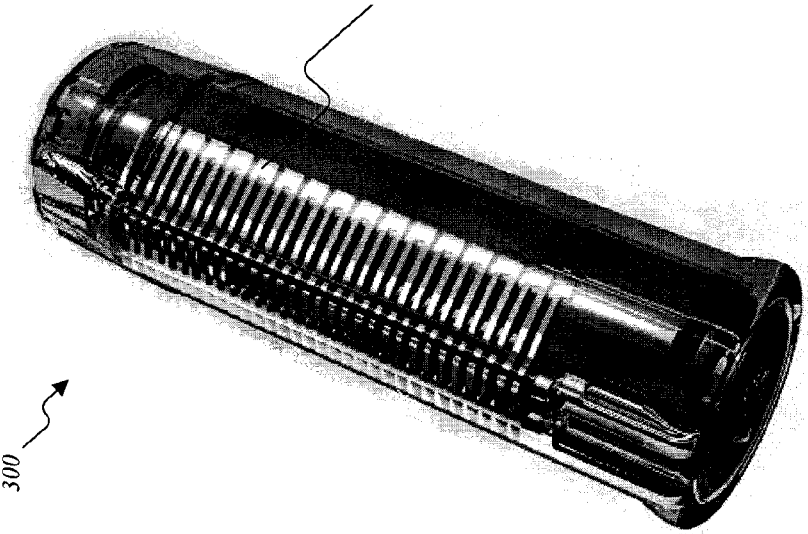
FIG. 5 illustrates a power receiver inside of the battery pack of FIG. 4 according to an embodiment of the invention.

FIGS. 5-7 illustrate battery packs 300, 305, and 310 that are operable to receive RF power signals from the power transmitters. The illustrated battery packs 300-310 are 4V lithium-ion ("Li-Ion") battery packs. However, in other embodiments, the battery packs 300-310 can have different voltages (e.g., 8V, 12V, 16V, 18V, 24V, 28V, 36V, 48V, etc.), chemistries (e.g., NiMH, Li, Lead-acid, Ni—Cd, etc.), shapes, or sizes. The battery packs 300-310 include at least one circuit and at least one of a plurality of types of antennas for receiving the RF power signals from the power transmitter. For example, FIG. 5 illustrates the use of a Mohawk circuit 315, FIG. 6 illustrates the use of a flex circuit 320, and FIG. 7 illustrates the use of a spiral circuit 325. In other embodiments, different circuits or antennas, such as dipole antennas, Yagi-Uda antennas, horn antennas, patch antennas, fractal antennas, and the like can be used.

Figure 8:
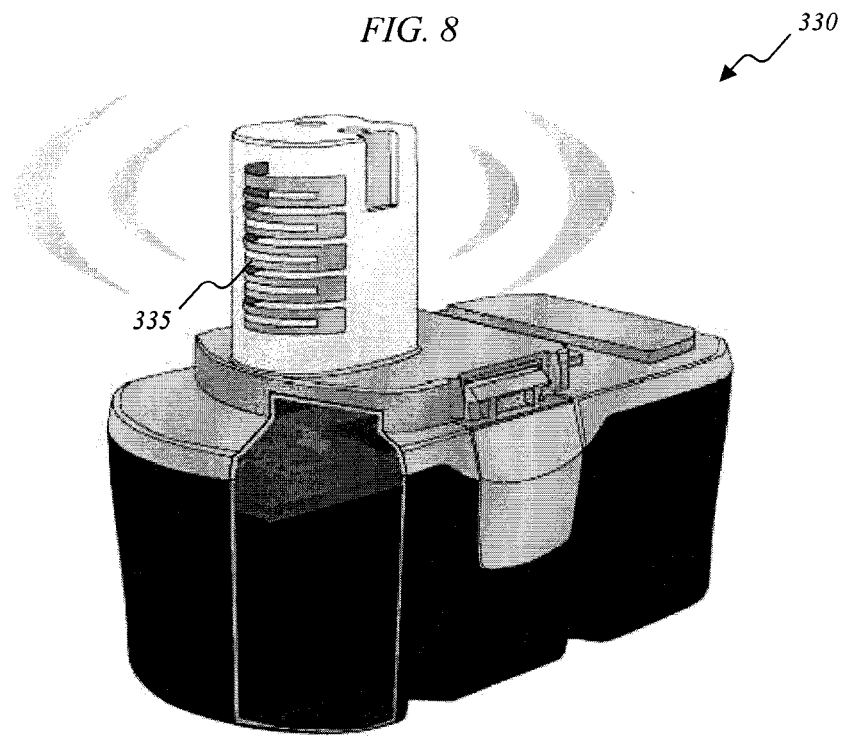
FIG. 8 illustrates a power receiver within a neck of a battery pack according to an embodiment of the invention.
Figure 9:
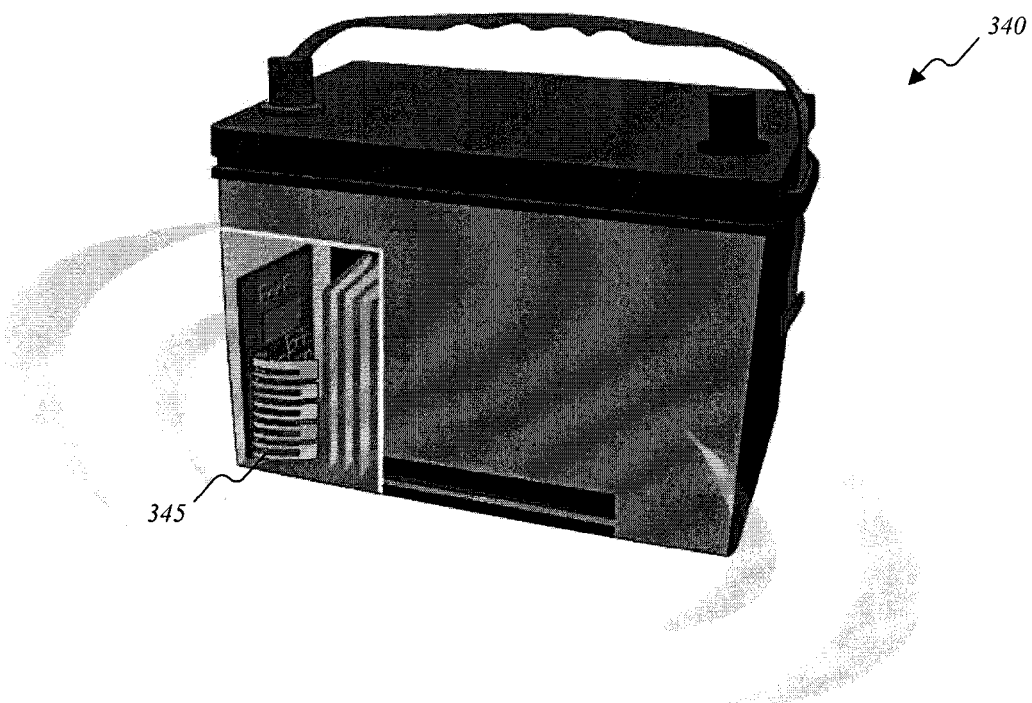
FIG. 9 illustrates a power receiver within a lead-acid battery according to an embodiment of the invention.

FIGS. 8 and 9 illustrate additional battery packs 330 and 340 which are able to receive power signals from the power transmitters 100 or 105. The battery pack 330 includes an antenna 335 in a neck of the battery pack. In some embodiments, the battery pack 330 is capable of simultaneously discharging stored energy and charging itself with power received at the antenna 335. Similarly, the battery pack 340 includes an antenna 345. The battery pack 340 is, for example, a sealed-lead acid battery for a vehicle. Like the battery pack 330, the battery pack 340 is capable of being charged using power signals received at the antenna 345 and discharging stored energy.

Like the power transmitters described above, the power harvesters or receivers can also be incorporated into a plurality of devices. For example, in one embodiment, a power harvester and an antenna can be incorporated into a tool case. The case is operable to receive and/or hold a tool. The case includes an interface for connecting to the tool when the tool is placed in the case. The case receives the RF power signals and transfers the power to the tool through the interface. As an illustrative example, the battery pack described above with respect to FIG. 4 includes a case that interfaces with the terminals of the battery pack. As a result, the power harvester and antenna do not need to be located within the battery pack, which reduces the size requirements of the battery pack housing. The battery packs are then charged when the battery pack is placed in the case, and is within range of a power transmitter. In other embodiments, the antenna is incorporated into a flexible circuit, and wrapped around the battery cell of the 4V battery pack described above. Alternatively, the antenna is printed on the inside of the battery pack housing.

Figure 10:
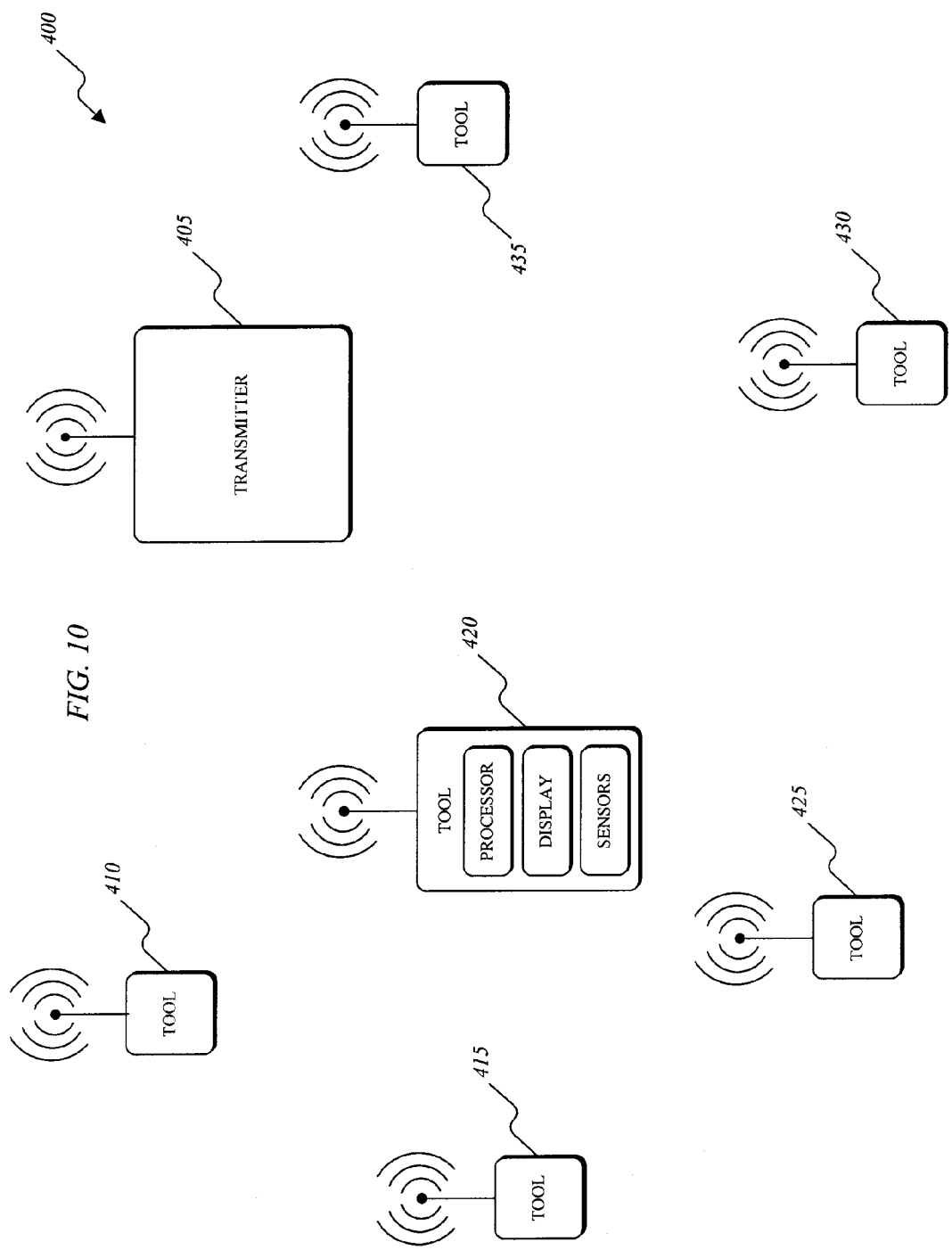
FIG. 10 illustrates a wireless power distribution system according to an embodiment of the invention.

FIG. 10 illustrates a wireless power distribution system 400 that includes a power transmitter 405 and a plurality of tools 410-435. Systems are known which incorporate radio frequency identification ("RFID") tags or devices into tools. The RFID tags are used to monitor and track the location of a tool related to a worksite. In the illustrated embodiment, the power transmitter 405 broadcasts RF power signals to the tools 410-435. The RF power signals are used to charge a battery pack or provide power to the tool as described above, as well as to power the RFID tags. In addition to the functions of the RFID tags (e.g., determining location), the tools 410-435 include a communications device, such as a Bluetooth transmitter or similar short-range communication device, to communicate with and provide battery charge information to the power transmitter 405, or a different component of the wireless power distribution system 400. Using the short-range communication, the tools 410-435 provide battery charge information signals that include, among other things, a signal indicating whether a battery pack is being charged, a signal indicating how long the battery pack has been charging, a signal indicating the charge level of the battery pack, signals indicating battery usage statistics, signals indicating the signal strength of the signals received from the power transmitter, signals indicating the proximity of the battery pack to one or more power transmitters, and the like. Additionally, the tools 410-435 provide a signal to the power transmitter 405 or a different component of the power distribution system 400 that indicates a battery pack has been fully charged. When the battery pack for each tool within the transmission range of the power transmitter 405 has been fully charged, the power transmitter 405 and the Bluetooth transmitters enter a sleep or low-power mode. The power transmitter 405 exits the low-power mode when a tool which requires charging comes within transmission range of the power transmitter 405, or a tool that is already within transmission range has a battery pack voltage that drops below a predetermined threshold level (e.g., 90% charge). The Bluetooth transmitters exit the low-power mode when the battery pack voltage level is below a predetermined level, and once again receives RF power signals from the power transmitter. Additionally or alternatively, the power transmitter 405 or Bluetooth transmitter are configured to periodically wake up from the sleep mode (e.g., every 10 minutes, 20 minutes, 30 minutes, etc.), in order to reduce the amount of power used by the distribution system while maintaining each battery pack's charge.

Figure 11:
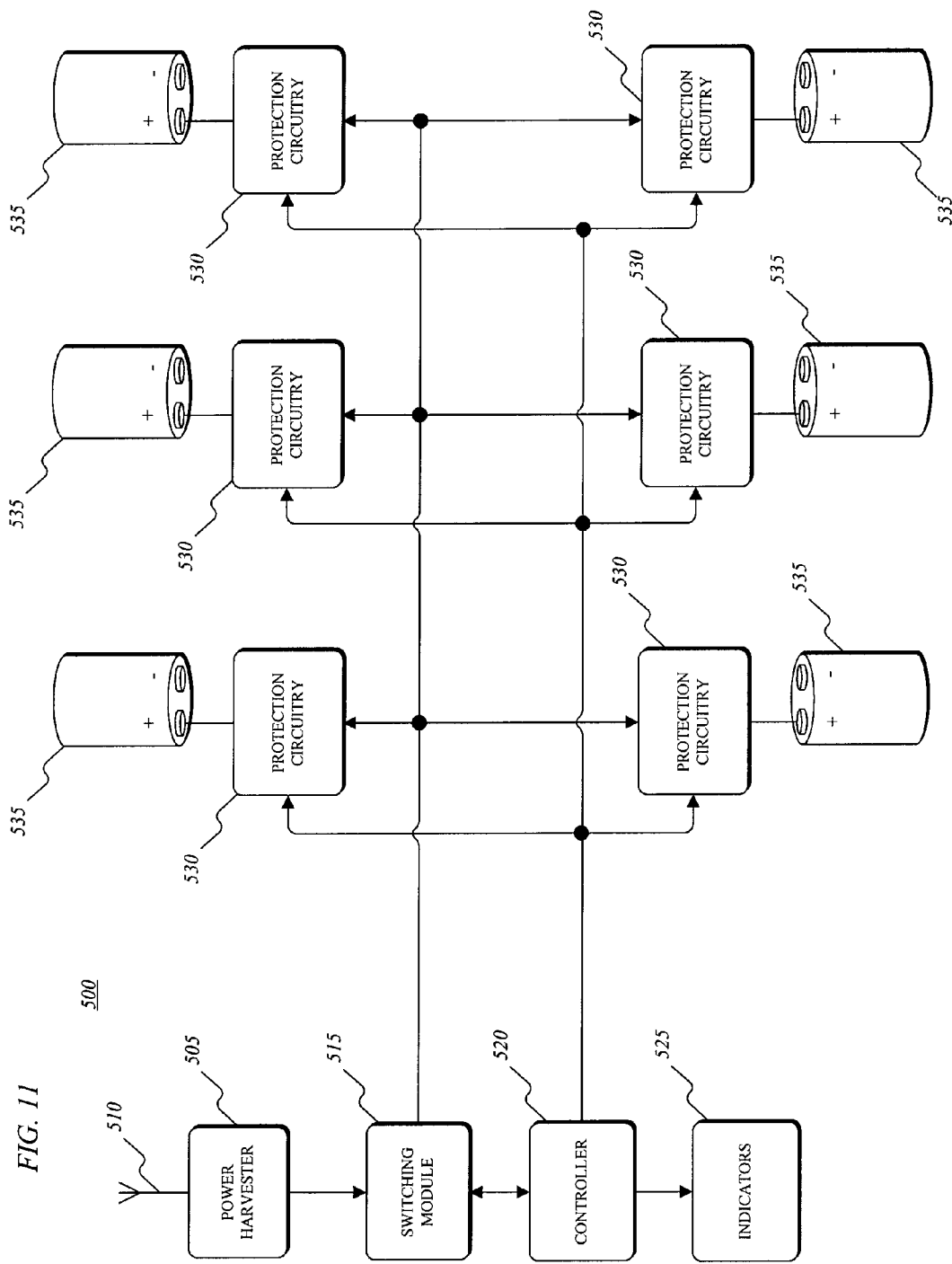
FIG. 11 illustrates a multi-port battery charger according to an embodiment of the invention.

Wireless power distribution systems 10 and 400 also include other devices, such as battery chargers. FIG. 11 illustrates a 6-port battery charger 500 that includes a power harvester 505, an antenna 510 for receiving RF power signals from a power transmitter, a switching module 515, a controller 520, a plurality of indicators 525, a plurality of protection circuits 530, and a plurality of battery packs 535. The harvester 505 can replace or supplement a conventional power supply that receives power from a 120V AC source, or the like. The battery charger 500 uses the power received from the power transmitter to charge the battery packs inserted into the charger 500.

Figure 12:
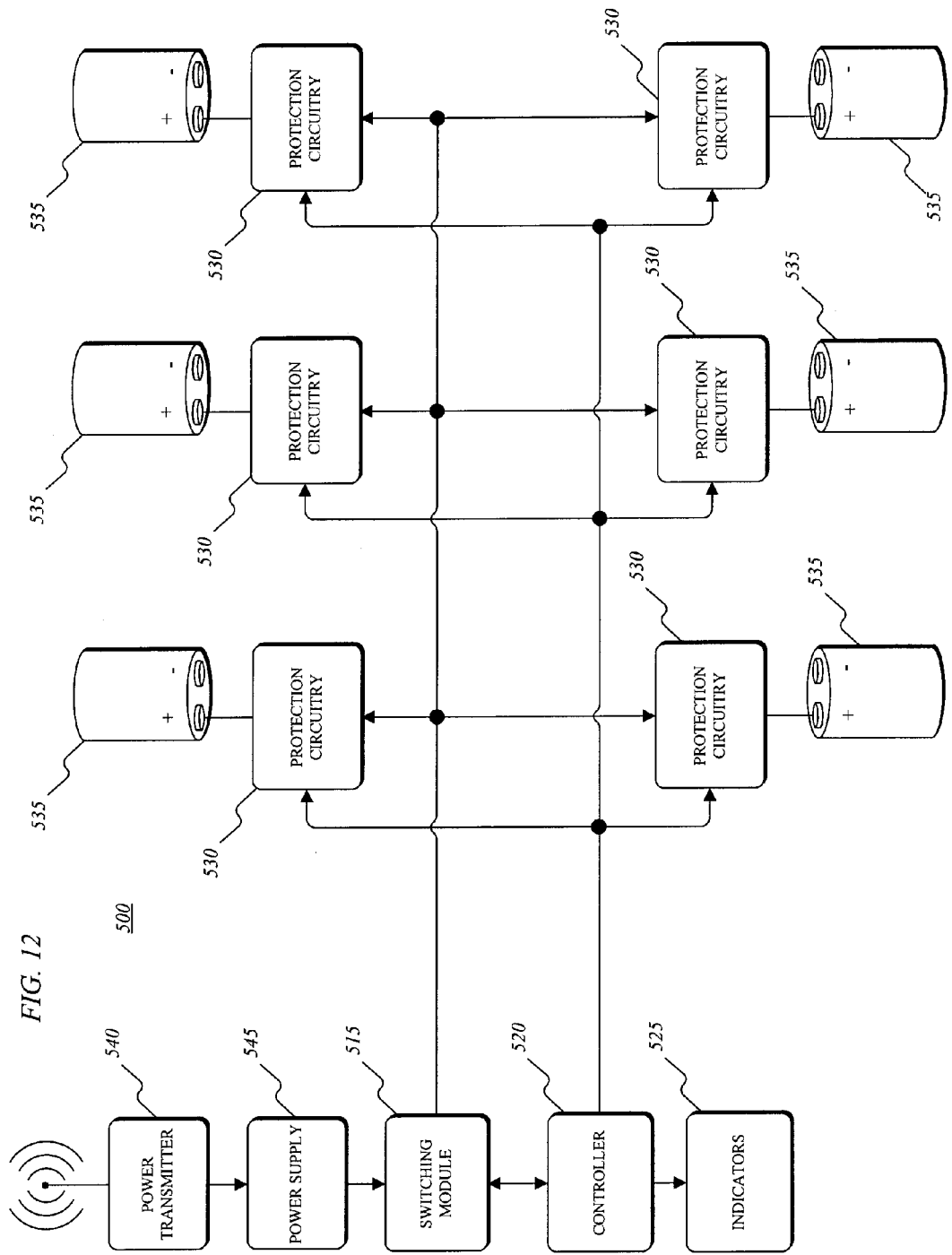
FIG. 12 illustrates a multi-port battery charger according to another embodiment of the invention.
Figure 14:
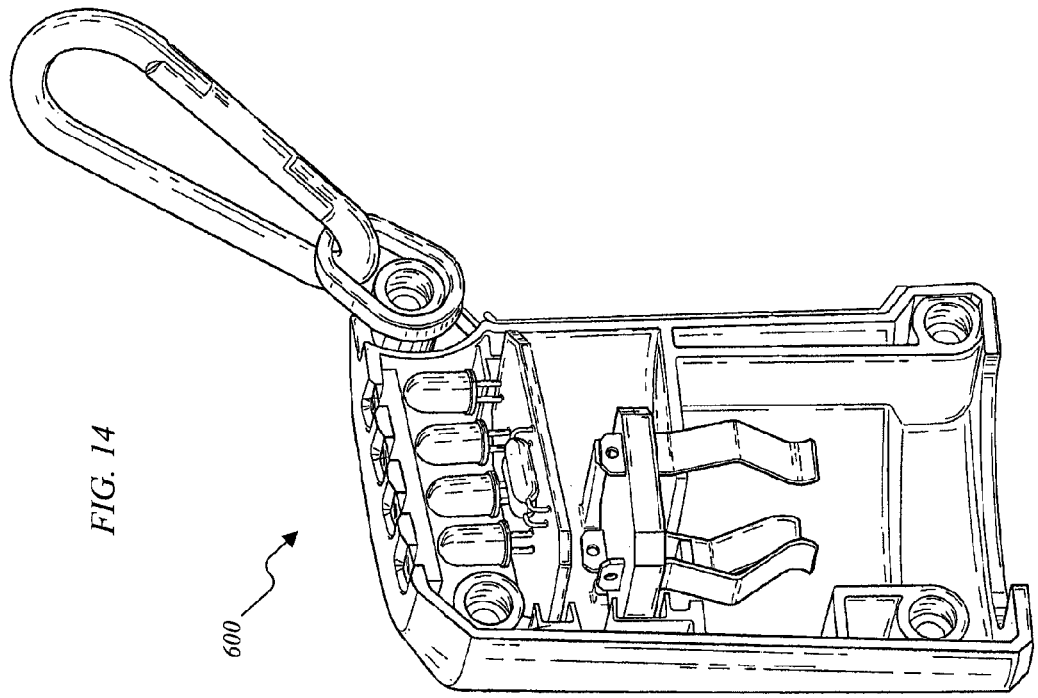
FIG. 14 is a cross-sectional view of the single-port battery charger of FIG. 13.
Figure 13:
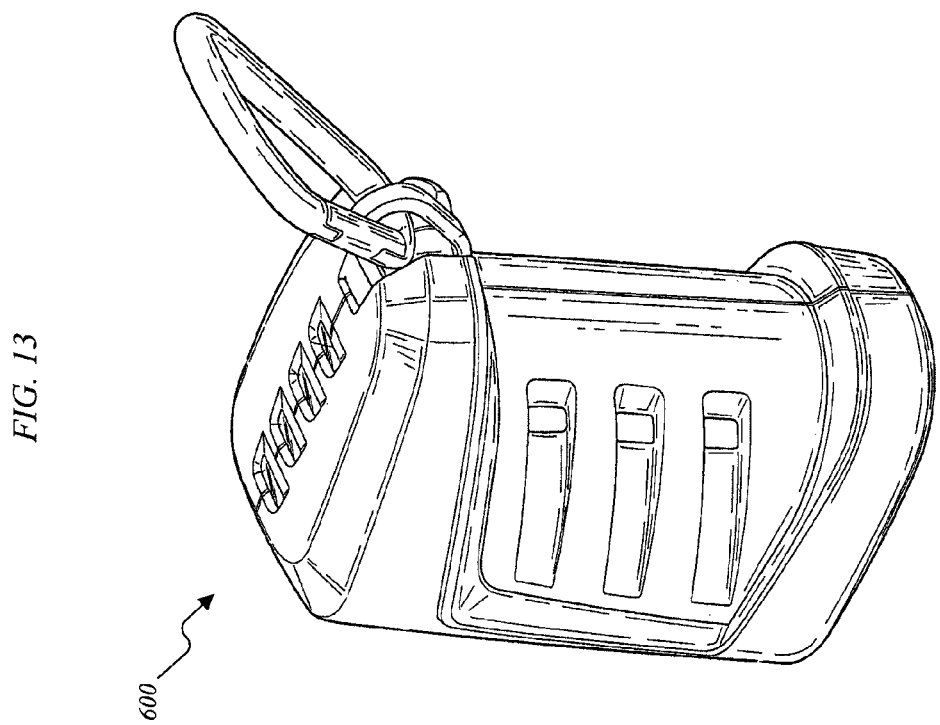
FIG. 13 illustrates a single-port battery charger according to an embodiment of the invention.

FIG. 12 illustrates an embodiment of the battery charger 500 that includes a power transmitter 540, a power supply 545, the switching module 515, the controller 520, the plurality of indicators 525, the plurality of protection circuits 530, and the plurality of battery packs 535. The battery charger 500 is capable of charging each battery pack inserted into the charging slots of the battery charger (e.g., six battery packs), as well as broadcasting RF power signals to charge other battery packs that include power harvesters, and are located within transmission range of the power transmitter 540.

The battery charger 500 cycles through each of a plurality of charging ports to determine which, if any, of the plurality of charging ports includes a battery pack that requires charging. If the battery charger 500 determines that a charging port includes a battery pack that requires charging, the battery charger 500 switches power from the power harvester 505 or power supply 545 such that a charging current is applied to a single battery pack. If the battery charger 500 determines that no battery packs inserted in the battery charger 500 require charging, the battery charger 500 enters a low-power mode in which the battery charger removes power from each of the charging ports and a display (e.g., liquid crystal display or light emitting diodes) to reduce the power requirements of the battery charger 500. If the battery charger 500 has already charged each of the battery packs inserted into the battery charger 500, and no new battery packs have been inserted into a charging port, the battery charger 500 supplies each inserted battery pack with a trickle charge for a predetermined period of time. The battery charger 500 includes additional functions similar to those described in U.S. Patent Publication No. 2010/0060232, filed on Sep. 8, 2009 and titled "Battery Charger," the entire content of which is hereby incorporated by reference.

Figure 20:
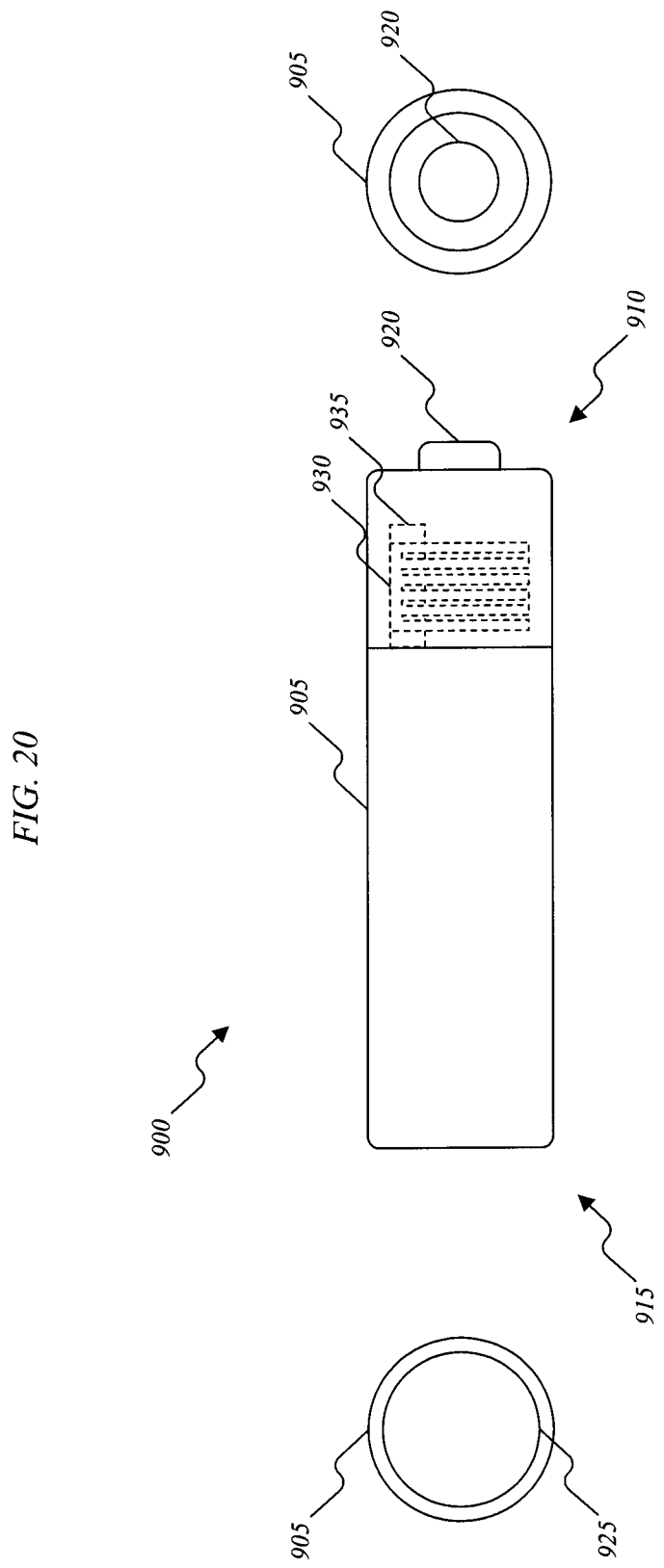
FIG. 20 illustrates a conventionally-sized battery including an antenna and a power harvester according to an embodiment of the invention.

In some embodiments of the invention, adapter devices, which include a power harvester and antenna for receiving RF power signals from the power transmitter, are used to charge conventionally-sized rechargeable batteries, such as AA, AAA, C, D, 9V, and the like. The adapters can be stand-alone devices, or can be integrated in an electrical device, such as a radio, a multimeter, a flashlight, a fuel gauge device, etc. Additionally or alternatively, power harvesters and antennas can be incorporated into conventionally-sized rechargeable batteries such that the batteries can be continuously charged when within the transmission range of a power transmitter. For example, FIG. 20 illustrates a conventionally-sized battery 900 that includes a housing 905, a positive end portion 910, and a negative end portion 915. The positive end portion 910 includes a positive terminal 920, and the negative end portion 915 includes a negative terminal 925. The battery 900 includes an antenna 930 and a power harvester 935 positioned within the housing 905 of the battery 900. The antenna 930 and power harvester 935 are configured to receive the RF power signals from a transmitter as described above in order to charge the battery 900. As such, a power transmitter located in a home or office can be used to charge each household device that receives conventional batteries (e.g., TV remotes, video game controllers, etc.) without having to remove the batteries from the devices, or charge the conventional batteries directly without having to remove the batteries from the devices.

FIGS. 13-16 illustrate a battery testing device 600 that is operable to couple to a conventional battery pack 605 and determine the charge of the battery pack. The battery tester 600 includes a housing 610 and a plurality of indicating devices 615 that indicate to a user the level of charge of the battery pack 605. The battery tester 600 also includes an antenna and a power harvester (not shown). The antenna and the power harvester receive RF power signals from a power transmitter to charge the conventional battery pack 605. The antenna and the power harvester are located within the housing 610 of the battery tester 600. In some embodiments, the antenna is located in a clip ring which is used to carry the testing device 600.

Figure 17:
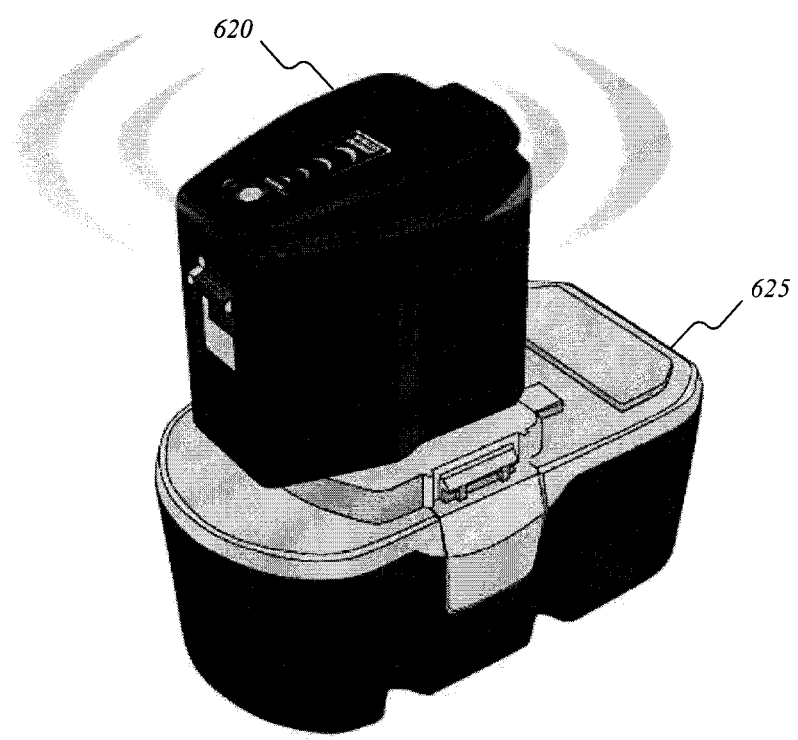
FIG. 17 illustrates a battery pack coupled to a single-port power transceiver.

FIG. 17 illustrates a wireless power transceiver 620. In one embodiment, the transceiver 620 is configured to receive power signals at a power harvester using an antenna, as previously described. The received power signals are used to charge a battery pack 625. In another embodiment, the transceiver 620 is configured to transmit power signals. For example, the transceiver 620 is coupled to the battery pack 625 and uses the energy stored in the battery pack to generate power signals. Such an embodiment is particularly beneficial when at a remote worksite and a number of devices require power (e.g., flashlights).

Figure 18:
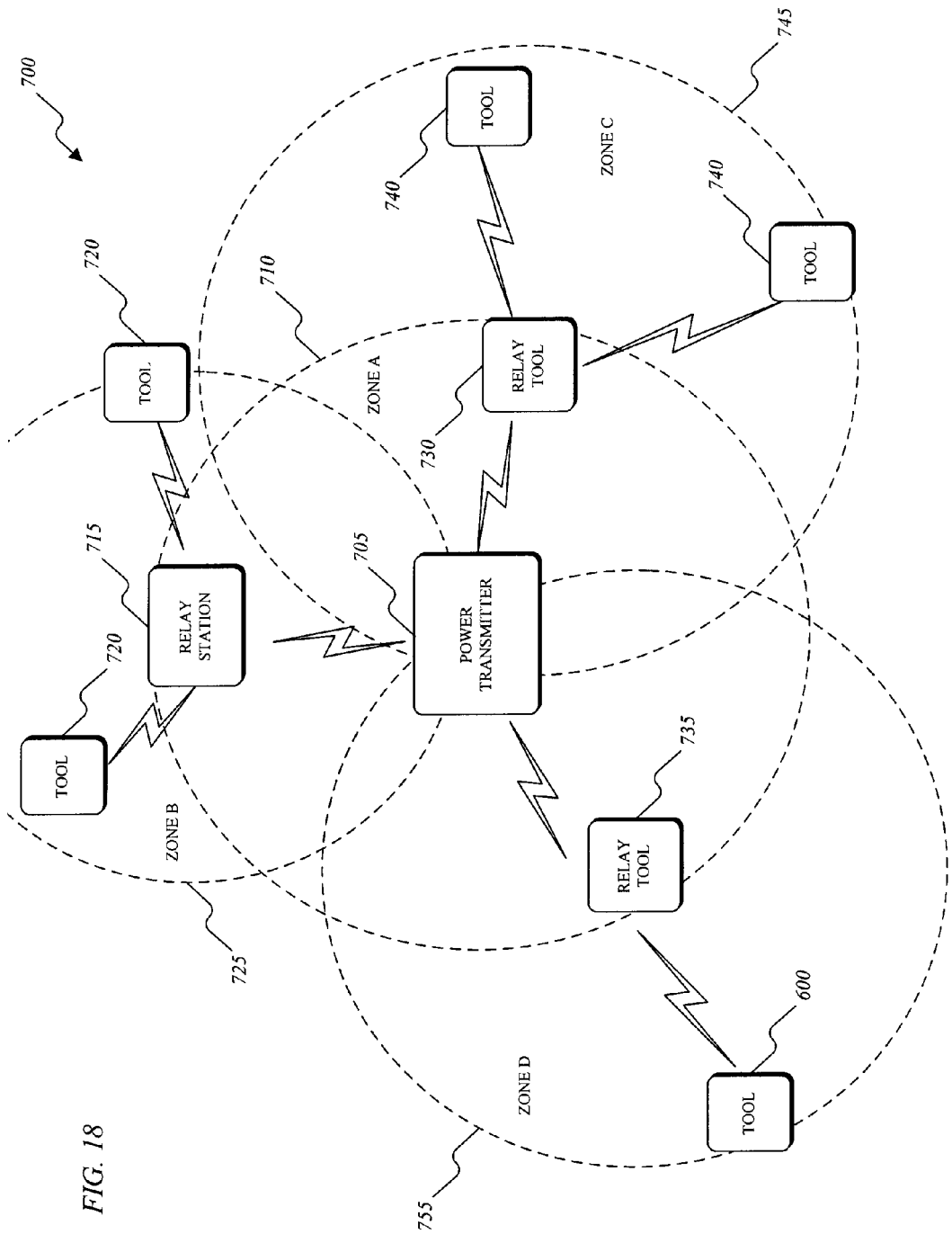
FIG. 18 illustrates a wireless power distribution system according to an embodiment of the invention.

FIG. 18 illustrates a wireless power distribution system 700. The system 700 includes a power transmitter 705 that has a first range 710 for providing wireless power to tools. The first range 710 is identified as zone A in FIG. 18. If a tool is located beyond zone A, the tool does not receive RF power signals from the power transmitter 705 that are above a threshold value, and therefore does not receive enough power to power the tool or charge its battery pack. To extend the range of the power transmitter 705, a relay station 715 is included in the power distribution system 700. The relay station 715 is operable to retransmit the RF signals from the power transmitter 705 to extend the range of the distribution system 700 to tools 720 in zone B 725. The relay station 715 includes, for example, both a transmitter and a receiver. In some embodiments, the relay station 715 is operable to retransmit the RF signals from the power transmitter 705 with a signal strength that is substantially similar to the initial RF power signal broadcast from the power transmitter 705. In other embodiments, the relay station 715 retransmits the RF signals at a lower signal strength than the original signals broadcast from the power transmitter 705. The system 700 also includes relay tools 730 and 735. The relay tools 730 and 735 function in a similar manner to the relay station 715, but the relay tools 730 and 735 are operable to have their batteries charged by the power transmitter 705, to be powered directly by the power transmitter 705, to retransmit RF signals from the power transmitter 705, or combinations thereof. For example, the relay tools 730 and 735 can be charged by the power transmitter 705 while simultaneously retransmitting the RF power signals from the power transmitter 705 to extend the range of the distribution system 700. The relay tool 730 provides RF power signals to tools 740 in zone C 745, and the relay tool 735 provides RF power signals to tool 750 in zone D 755. In such a situation, the relay tools 730 and 735 and the relay station 715 can include multiple transmitters and multiple receivers.

Figure 19:
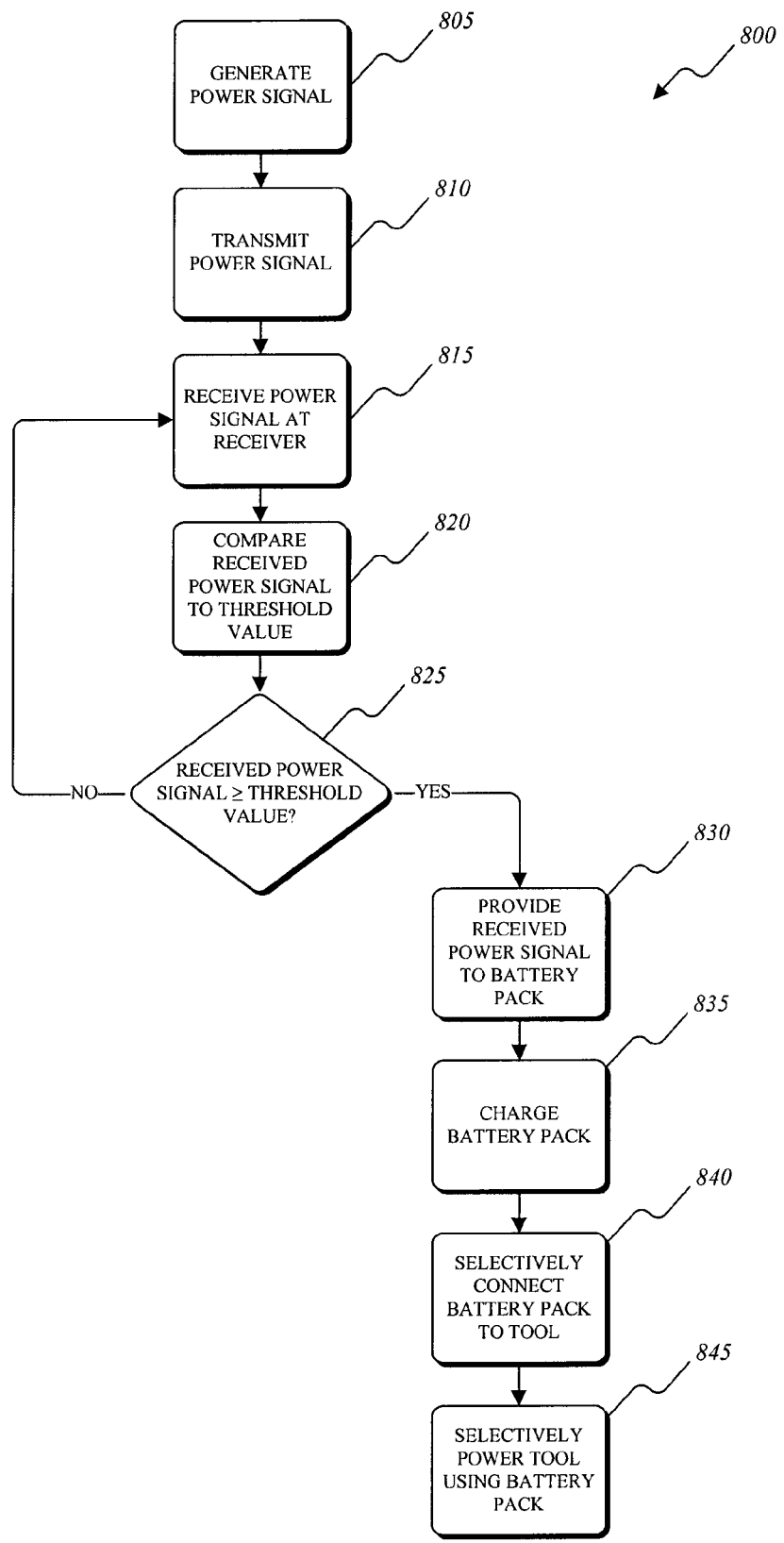
FIG. 19 is a process for wirelessly powering a tool.

FIG. 19 is a process 800 for wirelessly powering a tool. At step 805, a power transmitter generates a power signal. The power signal is transmitted (step 810) by the power transmitter within a first power distribution volume. If a power receiver is within the first power distribution volume, the power receiver receives the transmitted power signal (step 815). The received power signal is then compared to a threshold power value (step 820). For example, the threshold power value corresponds to a power level which is required to operate or at least partially operate a device. The threshold power value is different for different devices. A device with relatively high power requirements generally has a higher threshold power value. A device with relatively low power requirements generally has a lower threshold power value. If, at step 825, the received power signal is less than the threshold power value, the process 800 returns to step 815 and a newly received power signal is compared to the threshold power value. Although steps 815, 820, and 825 are shown incrementally, the reception and comparison of power signals to the threshold power value is performed continuously in some embodiments. In other embodiments, the reception of a power signal and the comparison of the received power signal to the threshold power value are performed as discrete steps, but are performed at a high sampling rate (e.g., more than 500 samples per second).

If the received power signal is greater than or equal to the threshold power value at step 825, the received power signal is provided to a battery pack (step 830). The battery pack uses the received power signal to charge its battery cell(s) (step 835). The battery pack is then selectively connected to a tool (step 840). In some embodiments, the battery pack continues to charge when connected to a tool. In other embodiments, the battery pack ceases charging when it is connected to the tool. The tool is then selectively powered using the energy stored in the battery pack (step 845). Additionally or alternatively, the tool is selectively powered using received power signals. In some embodiments, the tool is selectively powered using a switch to, for example, connect power to or disconnect power from a motor, a processor, a display, or the like. Due to the power requirements of tools (e.g., power tools, test and measurement devices, etc.) that include such devices, embodiments of the wireless power system in which the battery pack is capable of discharging stored energy and simultaneously recharging the battery cells are beneficial.

Figure 21:
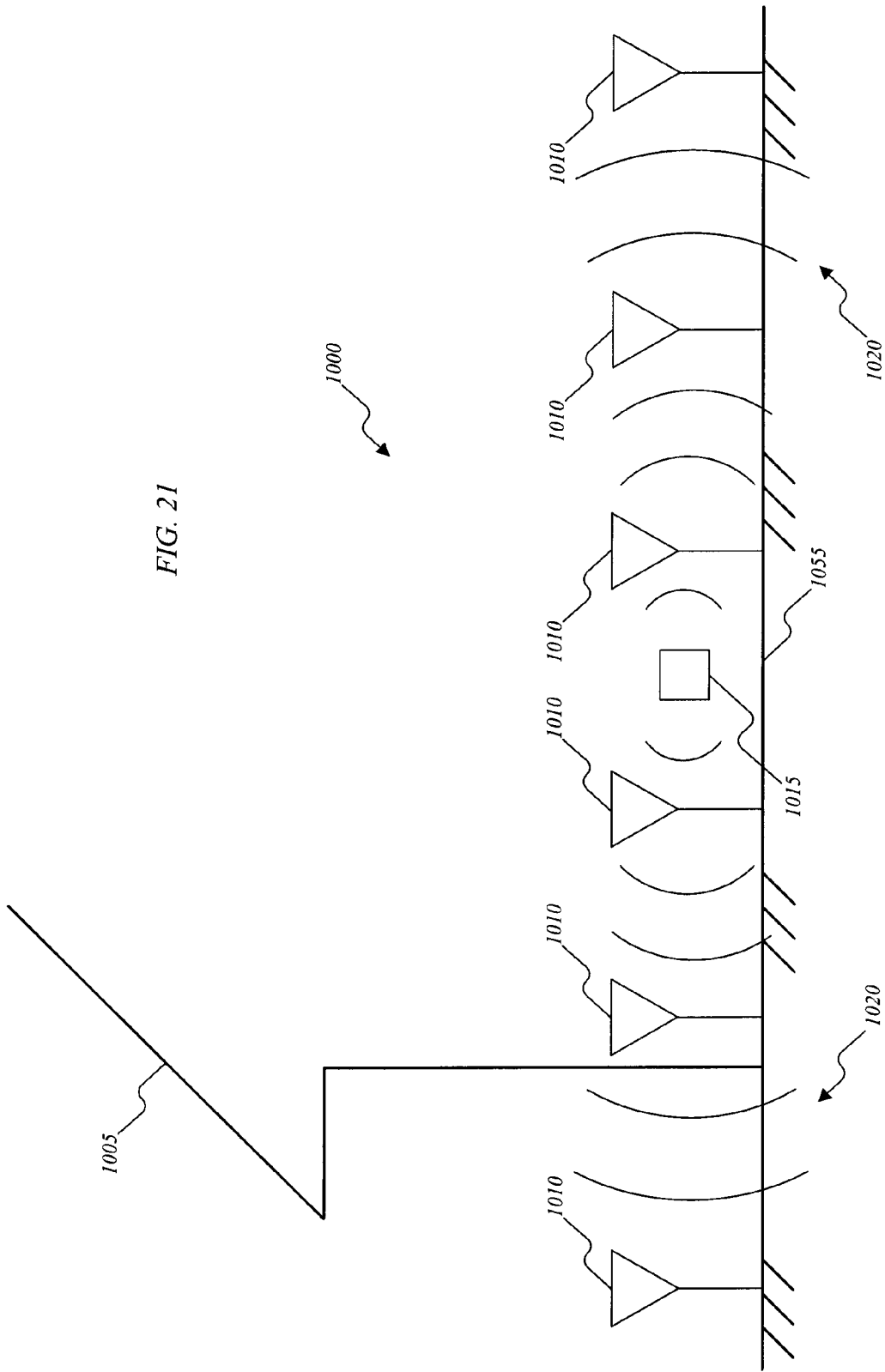
FIG. 21 illustrates a wireless power distribution system according to an embodiment of the invention.
Figure 22:
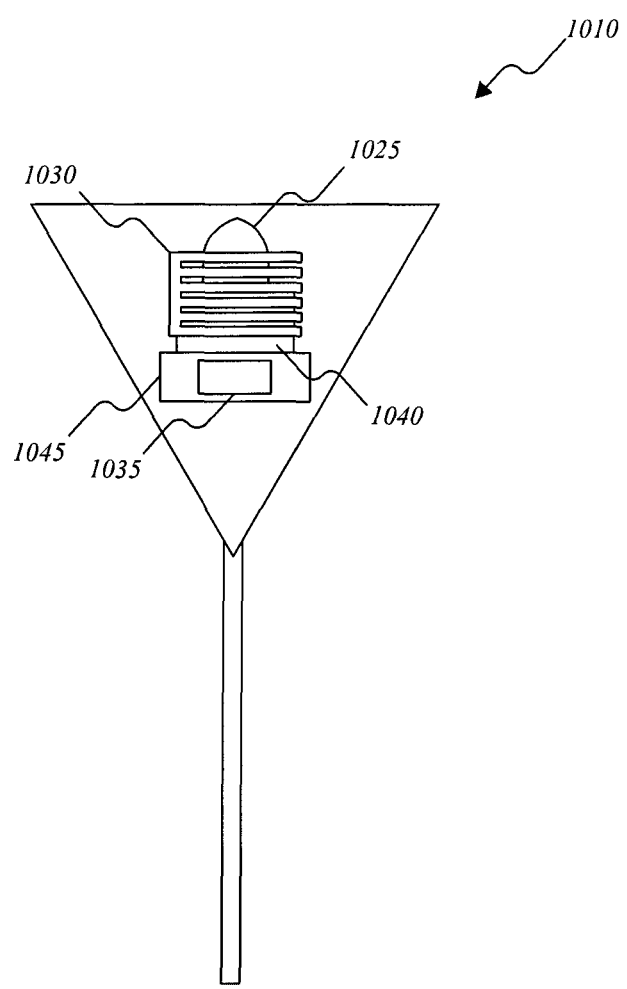
FIG. 22 illustrates a wireless power distribution system according to another embodiment of the invention.
Figure 23:
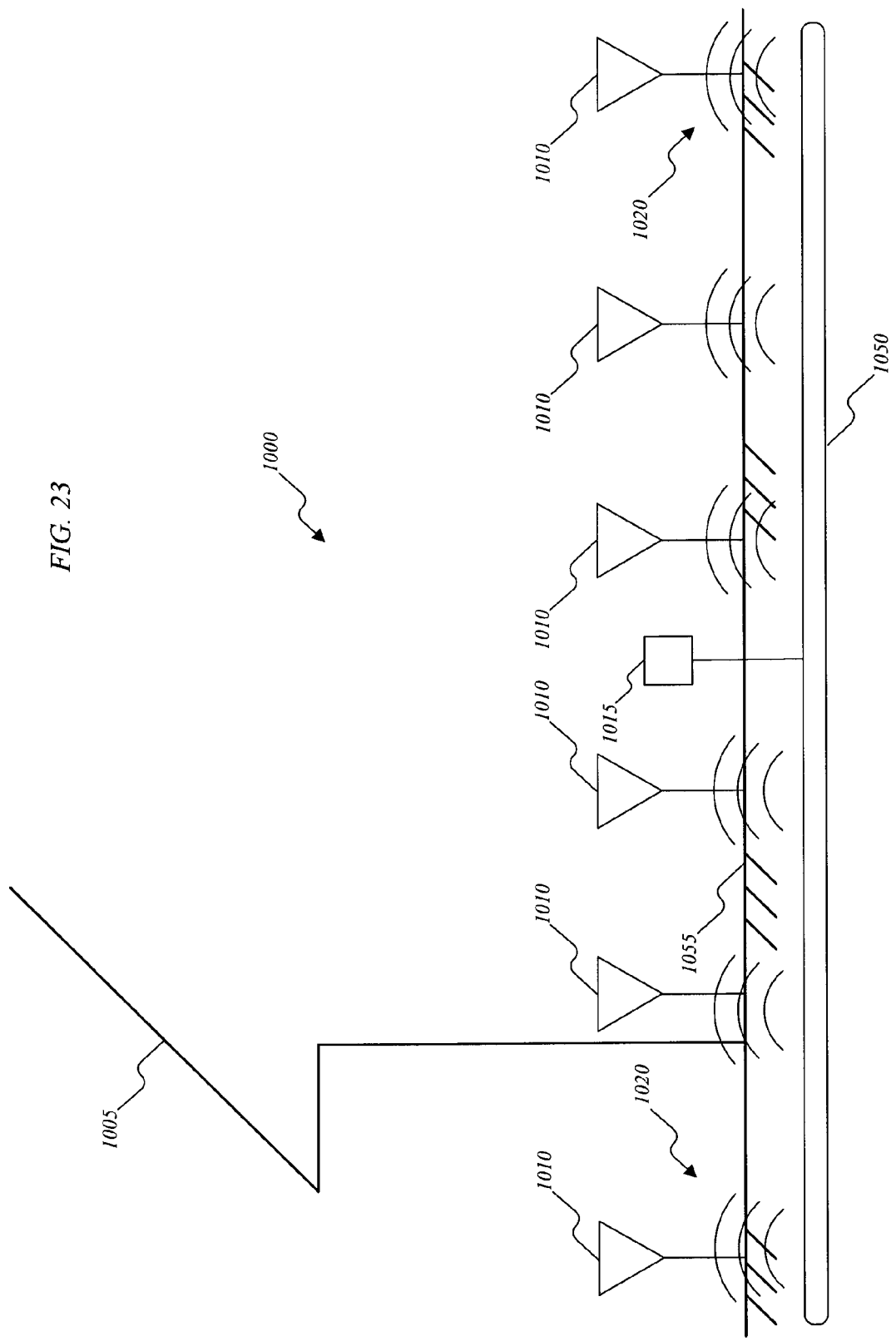
FIG. 23 illustrates a landscape light source according to an embodiment of the invention.

In some embodiments, a landscape lighting system is wirelessly powered as described above. For example, a landscape lighting system 1000 associated with a building 1005 includes a plurality of receivers 1010 and a transmitter 1015, as shown in FIG. 21. The transmitter 1015 is configured to generate and transmit a plurality of RF power signals 1020 to each of the receivers 1010. Each of the receivers (see FIG. 22) includes a light source 1025, an antenna 1030, a light sensor 1035, and a power harvester 1040 as described above for receiving the RF power signals 1020. The light source 1025 includes, for example, one or more light-emitting diodes ("LEDs"). In some embodiments, the LEDs are directly powered by the RF power signals 1020. In other embodiments, the receivers 1010 include a battery 1045 or other power storage device for storing the energy associated with the RF power signals 1020 and providing power to the LEDs. The light sensor 1035 is a photosensor or photodetector such as, for example, a photoresistor, a photodiode, a reverse-biased LED, a phototransistor, etc. The light sensor 1035 is used to determine when the light source 1025 should receive power from the battery 1045. For example, when the light sensor 1035 detects an amount of ambient light that is below a light threshold value, the light source 1025 is selectively powered from the battery 1045. FIG. 23 illustrates another embodiment of the landscape lighting system 1000. In FIG. 23, the transmitter 1015 includes a transmitting antenna 1050 that is, for example, buried below the surface of the ground 1055. The antenna 1050 shortens the distance between the transmitter 1015 and the receivers 1010, which allows the transmitter 1015 to provide RF power signals of consistent power levels to each of the receivers (i.e., with less attenuation in the RF power signals resulting from the distance between the transmitter 1015 and the receivers 1010).

Thus, the invention provides, among other things, wireless power distribution systems, methods, and devices for tools. The system includes a power transmitter and a plurality of power harvesters or receivers. The receivers are located in power tools, battery packs that are attachable to and detachable from the power tools, or a device or case that is interfaceable with the power tool or battery pack. The power transmitter transmits RF power signals to the power tools that are within transmission range of the power transmitter. The receivers receive the RF power signals and convert the RF power signals into direct current. The direct current is used to charge a battery, directly power a tool, or both. Various features and advantages of the invention are set forth in the following claims.

What is claimed is:

1. A wireless power distribution system comprising:
   a power transmitter configured to transmit a power signal within a first power distribution volume;
   a power harvester configured to receive the power signal, wherein the power harvester is also configured to determine whether the received power signal is greater than a threshold power value;
   a conventionally-sized battery configured to be in electrical communication with the power harvester and receive power from the power harvester when the received power signal is greater than the threshold power value, wherein the power harvester is positioned within a housing of the conventionally-sized battery; and
   a second power harvester and a battery charger, the second power harvester configured to receive the power signal, wherein the second power harvester is connected to the battery charger and the battery charger includes a plurality of charging ports.

2. The system of claim 1, further comprising a relay module configured to receive a power signal from the power transmitter and transmit power within a second power distribution volume.

3. The system of claim 1, wherein the conventionally-sized battery is one of an AA, AAA, C, D, and 9V battery.

4. The system of claim 1, wherein the power signal received by the second power harvester is provided to the battery charger and the battery charger is configured to selectively provide power to the plurality of charging ports.

5. The system of claim 1, wherein the power harvester includes an antenna, the antenna being positioned within the housing of the conventionally-sized battery.

6. The system of claim 1, wherein the conventionally-sized battery is a lithium-based battery.

7. The system of claim 1, wherein the conventionally-sized battery is operable to be received in and power a device.

8. The system of claim 7, wherein the conventionally-sized battery is capable of being charged without being removed from the device.

9. A method of wirelessly distributing power, the method comprising:
   generating a power signal at a power transmitter;
   transmitting the power signal within a power distribution volume;
   receiving the power signal at a power harvester;
   comparing the received power signal to a power threshold value;
   providing the received power signal to a battery when the received power signal is greater than the power threshold value;
   charging the battery using the received power signal,
   selectively inserting the battery into a device,
   selectively powering the device using the battery when the power signal is below the power threshold value,
   wherein the battery is capable of being charged without being removed from the device;
   receiving the power signal from the power transmitter at a relay module; and
   transmitting power from the relay module within a second power distribution volume.

10. The system of claim 9, wherein the battery is one of an AA, AAA, C, D, and 9V battery.

11. The system of claim 9, wherein the battery is a lithium-based battery.

12. The system of claim 9, wherein the power harvester is positioned within a housing of the battery.

* * * * *